United States Patent Office 3,267,064
Patented August 16, 1966

3,267,064
POLYMERIC AZO DYES FROM PHENOLIC RESINS
Abraham Ravve, Chester W. Fitko, and Jerome C. Brichta, Jr., Chicago, Ill., assignors to Continental Can Company, Inc., New York, N.Y., a corporation of New York
No Drawing. Filed Aug. 23, 1961, Ser. No. 133,293
7 Claims. (Cl. 260—38)

This invention relates to the preparation of colored resinous materials useful as components of inks, solid bodies, and coating compositions.

It is often desired to employ such colored resinous materials. When the coloring is provided by a commercial dyestuff, as distinguished from pigment particles, it is necessary on the one hand to have the dyestuff uniformly distributed throughout the resinous mass, which can be accomplished by employing a dyestuff that is itself soluble in solvent for the resin, and on the other hand to have the dyestuff fixed in the coating so that it is not altered or removed by the leaching action of water, oils, fats, or solvents even at processing temperatures which may be 240 degrees F. or more. Such requirements are thus essentially contradictory, because the simple mechanical mixtures are subject to solvent and other attack whereby the dyestuff is leached out or modified in color: and a practice has been to rely upon pigments or upon the curing of the resin for encapsulating and protecting the enclosed part of the dyestuff from ambient agents. Since the cured resin must exhibit the color at its surface, the surface portions are still exposed to the deteriorative action.

It has been found that coloring matter for resins can be produced by coupling the dyestuff to resin progenitors so that, during the curing of the resin from intermediate form to its final state, the dyestuff-coupled progenitor takes part in the curing and thereby attains a stage of non-solubility corresponding to that of the major resin base itself. Preferably, by use of a progenitor from the same components as the major resin, interconnection of the same occurs to a macro-molecular structure in which the major resin and the dyestuff are chemically coupled in a cross-linked three-dimensional form in the enamel matrix.

By the practice of this invention, chromophor groups are introduced into the intermediate polymer, and this intermediate polymer is then caused to cross-link with itself or with other reactive polymers, so that the cured polymer is itself a dye rather than a mechanical mixture with a dispersed conventional dye.

An object of this invention is the preparation of colorants for organic coatings, inks, and plastic bodies through the preparation of polymeric substances possessing multiple azo groups.

Another object is the preparation of a non-extractable and insoluble polymeric colorant which is safer and less toxic than the equivalent non-polymeric colorants for packaging of goods: and therein satisfies an important requirement of colorants for use in packages for foods in that these colorants must be insoluble and non-extractable by the food within the package.

Another object of this invention is to improve the compatibility of colorants in many types of polymers that are used for packaging foods: in that the compatibility of polymeric colorants in packaging materials having long alkyl groups is improved by using polymeric colorants which themselves contain large alkyl groups attached to phenolic nuclei.

A polymeric dye according to this invention can be prepared in three steps. In the first step, phenol is reacted with an aldehyde or ketone to form a novolac polymer. In step two, a diazonium salt is coupled to the novolac prepared in step one. In the third step, the modified novolac of step two is converted into a thermosetting resin by (1) Reaction with a formaldehyde or formaldehyde yielding materials to form either resoles or phenolic amines under basic conditions, or
(2) combining with a resole or a urea-formaldehyde resin or a melamine formaldehyde resin, or
(3) combining with resins bearing epoxy groups.

Such resins can be employed in inks, coating compositions, and molding resins: and converted to cross-linked form by heating.

The three steps can be represented by the formulary equations:

STEP ONE

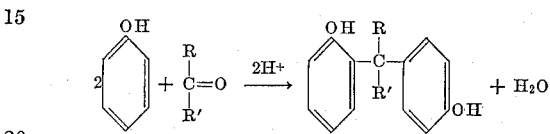

Where a novolac of two phenol units is formed: R and R' representing hydrogen or alkyl groups.

STEP TWO

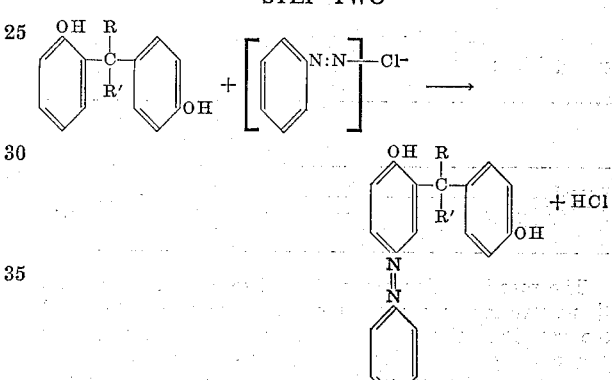

STEP THREE

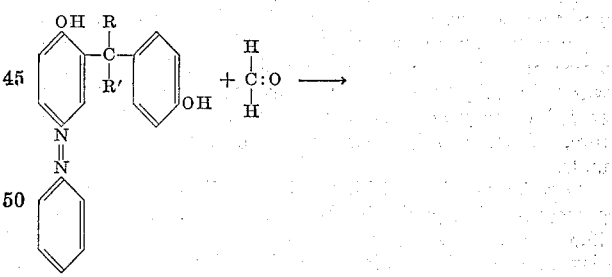

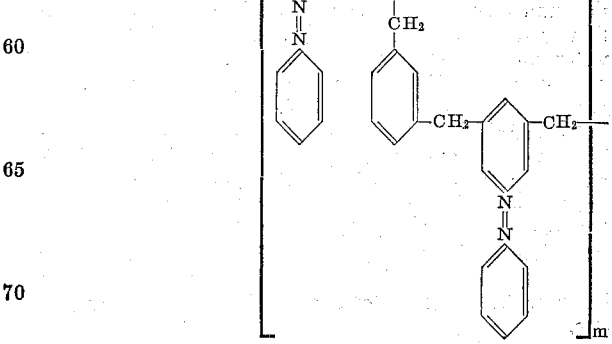

Where *m* denotes presence of a number of such units. The benzene diazonium chloride shown in Step Two is illustrative of aromatic diazonium salts prepared from anilines, including anthranilic acid, nitroanilines, toluidine, etc.

An alternative method of preparation is by use of aromatic polyamines, such as p-phenylene diamine or 4,4′ diamino diphenyl sulfone, to obtain higher molecular weight linear thermoplastic polymers with azo bonds. A polymer unit thus prepared may be represented by Hexamethylene tetramine may be similarly employed, in like ratio without the use of additional catalyst.

The selection of proportion gives a greater density of cross-linking as the amount of aldehyde or hexamethylene tetramine is increased.

Alternatively, these dyestuff-coupled phenolic resins can be brought to thermoset form by mixing with materials bearing epirane groups, such as bisphenol A diglycidyl ethers. The epoxy group reacts with the phenolic —OH group and ties the dye into the polymer. In practice,

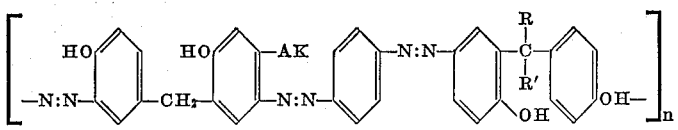

Where *n* denotes the presence of a number of such units. Such molecules can be cross-linked into three-dimensional thermoset resins by heating. Ak represents hydrogen when no alkyl branch is present, or an alkyl group of 8 to 18 carbon atoms when present.

*Example I*

*Step One.*—A phenol-formaldehyde novolac was prepared from:

|  | Mole Ratio | Weights |
|---|---|---|
| Phenol | 1.0 | 94 g. |
| Formaldehyde (as formalin 37%) | 0.65 | 19.5 g. (52.5 g.). |
| Concentrated HCl |  | 1 ml. |

The reaction mixture was heated to 35° C. The reaction exotherm then raised the temperature to 40° C. and the reaction mixture was kept at that temperature for one and one-half hours. After this the reaction temperature was raised to 50° C. and kept there for one more hour. This was followed by one hour at 60° C. and then two hours at 90–95° C. The reaction resin was then allowed to settle (one hour) and the aqueous layer removed; the resin was three times washed with water at 70° C. to make the resin neutral. The resin was then dehydrated under 24 inches (Hg) of vacuum at 75° C. to yield a clear resin, solid at room temperature. Such novolac has approximately three phenol units.

*Step Two.*—Anthranilic acid was diazotized by the procedure of Organic Synthesis, Col., vol. 1, page 374; 43.3 grams of anthranilic acid were converted to the diazonium salt in solution. To this solution were added dropwise 43 grams of the above novolac in 180 milliliters of water and 20 grams of sodium hydroxide. Upon the addition, a dark red solution of the azo dye was formed. The azo dye was precipitated by the addition of 15–20 milliliters of glacial acetic acid, collected by filtration and repeatedly washed with dilute acetic acid solution to remove all sodium ions. This was followed by water washing to remove the acid. The azo compound can be recrystallized from water acetone mixture. It is soluble in acetone and alcohol.

*Step Three.*—The azo dye prepared as above was combined with formaldehyde (as methyl alcohol solution) and catalytic amounts of triethyl amine (0.1 mole) and heated with stirring at 85° C. for 8 to 10 hours to a Stokes cure of 100 seconds at 130° C. The resin is then precipitated with the addition of toluene, separated by filtration, and dried. The quantity of formaldehyde may be from 0.7 to 1.5 moles per one-third mole of novolac dye.

this method sometimes exhibits the drawback that azo groups themselves are capable of addition to the epirane ring and hence some color loss may result especially with high epoxy content and elevated temperatures.

The novolac produced by Step One can be replaced in whole or part by commercially available phenol-formaldehyde novolacs, phenol-acetone novolacs such as bisphenol A, or products of condensation of phenol with a carbonyl group.

*Example II*

*Step One.*—Preparation of phenol-formaldehyde novolac:

|  | Mole Ratio | Weights |
|---|---|---|
| Phenol | 1.0 | 94 g. |
| Formaldehyde (formalin 37%) | 0.65 | 19.5 g. (52.5 g.). |
| Concentrated HCl |  | 1 ml. |

The reaction solution was heated to 35° C. The reaction exotherm raised the temperature to 40° C. and the reaction solution was kept at that temperature for one and one-half hours by means of cooling. The reaction was continued at 50° C. for one hour, 60° C. for one hour and two hours at 90–95° C., respectively. The resin was allowed to settle for an hour and the upper aqueous layer was decanted. The resin was washed with hot water at 70–90° C. three times to remove the acidity. The water was removed from the resin at 24 inches (Hg) of vacuum at 75° C. The resin was a clear solid at room temperature: being a novolac with approximately three phenol units.

*Step Two.*—4,4′ diamino diphenyl sulfone was purified by dissolving the material in boiling water, filtering off the impurities and allowing the 4,4′ diamino diphenyl sulfone to crystallize out on cooling. 24.8 grams of the sulfone were added to the 9.3 grams of concentrated (1.19 sp. gr.) hydrochloric acid in 100 grams of water. The mixture was heated to effect solution and then allowed to cool. The acid salt precipitated out on cooling. The purified 4,4′ diamino diphenyl sulfone hydrochloride was placed in a container which was immersed in a bath at 0° C. Fifteen grams of concentrated (1.19 sp. gr.) hydrochloric acid and 75 grams of crushed ice were added. Then a solution of 7.3 grams of sodium nitrite in 50 grams water, was added dropwise beneath the acid salt-ice mixture. The sodium nitrite was added over a one hour period, keeping the temperature of the reaction mixture below 3° C. Stirring was continued for an additional hour after adding the sodium nitrite. Then a solution containing 92 grams of the novolac from Step One and 36 grams sodium hydroxide in 72 grams of water was added slowly. The color of the mixture turned from tan to brick red. The mixture was allowed to react overnight at 30° C. The polymeric colorant was filtered off and washed three times with hot water. It was air-dried for two days and yielded 17 grams of brick red powder.

The filtrate was acidified with acetic acid, and the precipitate was filtered off and washed with hot water. The yield was 58 grams of amorphous brittle solid.

*Step Three.*—The polymeric colorant from Step Two can be converted into thermosetting polymers in any of the following manners, depending on the final product desired:

(1) Conversion into resole by reaction with formaldehyde in the presence of basic catalysts.

(2) Combining with other phenolic resoles, melamine or urea formaldehyde resins as co-curing agents.

(3) Mixing with hexamethylene tetramine to form thermosetting compounds.

(4) Co-reaction with epoxy resins.

Thus, the azo compound of Step Two can be dissolved in butyl alcohol. A quantity of solution containing 22 grams of the polymeric colorant was mixed with 40 grams of methyl formcel (40 percent methyl alcohol solution of formaldehyde) and 10 grams of triethyl amine. The mixture was heated, with stirring, at 85 degrees C. for 8 to 10 hours, until the product had a Stokes cure value of 100 seconds at 130 degrees C. Toluene was added to precipitate the resin, which was washed with toluene and then dried. The resin was a thermosetting polymer.

With hexamethylene tetramine, the butyl alcohol solution of the dye, containing a little, say 5 to 10 percent of isopropyl alcohol is mixed with an alcohol-water solution of hexamethylene tetramine: the proportions being about one-tenth mole of the polymeric colorant (e.g. 147 grams) to 0.3 mole of the hexamethylene tetramine. This was then employed in formulating the thermosetting coating composition.

With epoxy resins, a typical procedure is to dissolve 30 grams of the polymeric dyestuff in butanol, and blend with 200 grams of 50 percent NVM solution of bis 4,4′ diglycidyl ether of bisphenol A (the commercially available Epon Resin 1001 is satisfactory). The reaction mixture was applied to metal plate as a coating, and baked at 400 degrees F. for 10 minutes. The resultant baked coating had an orange color, lighter in shade than the original reaction mixture.

The azo-phenolic novolac compounds obtained by Step Three of Examples I and II can be mixed in any proportion with an alkali-condensed phenol: aldehyde resole, and employed as such. The color becomes deeper as the amount of azo-phenolic compound is increased. For example, three parts of the azo-phenolic novolac can be mixed with one part of commercial phenol: formaldehyde resole, in a solvent for the latter, to produce a master color component. This master component can then be blended with further commercial phenolic resole solution, in amounts to obtain the desired color depth, along with pigments and other customary components of an enamel coating composition, including a volatile solvent to bring the mixture to proper consistency for spray, roller, or brush application. The butyl alcohol and toluene employed for forming the liquid coating compositions, are examples of known inert volatile organic solvents for such resin bases. Upon applying to metal and baking at 300 to 400 degrees C. for 8 to 15 minutes, the curing occurs and the several phenolic components link together in a three-dimensional thermoset structure which is itself insoluble in water and organic solvents and not attacked by food fats and the like, and which has the color factor chemically bonded into the structure. The material itself, and in the mixtures, bonds well to black plate and tinplate and like metals which are substantially non-reactive with respect to the resinous coating compositions.

The dyes are very intense in color, and can be added in the range of 0.05 to 1.0 percent by weight of total solids, depending upon the depth of color desired. The remainder of the solids of the coating composition can be vinyl resins such as polyvinyl chloride or polyvinylidene chloride, phenolic resins, or epoxy resins. Presently used coating compositions of such resins can receive the dye without other change of formulation.

Phenolic-amine-aldehyde, epoxy resins such as the glycidyl ethers formed by the reaction of epichlorohydrin upon bisphenol A, and the reactive products of partial condensation of such epoxy phenol compounds, may be substituted in whole or part for the phenolic resole.

When a strong color effect is desired, the azo-phenolic compound of the examples can be converted from novolac form by adding hexamethylene tetramine and heating to develop the cross-linking characteristic of a phenolic resin. This can be taken up in a solvent, and employed in a colored coating composition. Upon baking, the resole groups cross-link together as usual, and form a film in which the dyestuff is chemically bound.

The azo-phenolic novolac compounds of the examples can be mixed with formaldehyde or its products such as paraformaldehyde under alkaline conditions at room temperature. The colored resole compound cross-links with itself upon baking.

The thermoplastic azo-phenolic novolac resin of Example I, or the thermosetting azo-phenolic resoles of Example II can be employed in admixture with other non-reactive resins such as the polyvinyl compounds inclusive of homo- and co-polymers of vinyl chloride, vinylidene chloride, vinyl acetate, vinyl alcohol, acrylonitrile, for action as a high molecular weight, non-extractable dye.

The illustrative practices are not restrictive, and the invention can be practiced in many ways within the scope of the appended claims.

What is claimed is:

1. The method of forming a thermosetting polymer dyestuff, which comprises coupling a colored diazonium salt of a primary aromatic amine to a phenol novolac resin in the presence of an alkaline agent, and mixing the product with a resin selected from the class consisting of phenol-aldehyde resoles, phenol-aldehyde-amine resins, and glycidyl ethers of bisphenol A.

2. The method of forming a thermoset polymer dyestuff coating which comprises coupling a colored diazonium salt of a primary aromatic amine to a phenol novolac resin in the presence of an alkaline agent, mixing the product with a compound selected from the class consisting of formaldehyde, hexamethylene tetramine, and glycidyl ethers of bisphenol A, applying the mixture to a substantially non-reactive metal sheet, and baking at 300 to 400° F. and 8 to 10 minutes for effecting cross-linkage of the coupled dyestuff-resin.

3. The method as in claim 2, in which a compatible phenolic resole is added to the mixture.

4. The method of forming an insoluble thermoset colored coating upon metal, which comprises coupling a colored diazonium compound of a primary aromatic amine with a phenol novolac resin in the presence of an alkaline agent, mixing the product with a resin selected from the class consisting of polyvinyl chloride, polyvinylidene chloride, phenolic and glycidyl ethers of bisphenol A, and with a compound selected from the class consisting of formaldehyde, hexamethylene tetramine, and epoxy compounds, applying the mixture to substantially non-reactive metal, and baking at 300 to 400° F. for 8 to 10 minutes for effecting cross-linkage of the coupled diazo-novolac.

5. A coating composition comprising the solution in an inert volatile organic solvent of the coupled product of a colored diazonium salt of a primary aromatic amine and a phenol novolac resin, and a compound selected from the class consisting of formaldehyde, hexamethylene tetramine, and glycidyl ethers of bisphenol A.

6. A coating composition as in claim 5, comprising a resin selected from the class consisting of polyvinyl chloride, polyvinylidene chloride, phenolic resins and glycidyl ethers of bisphenol A, the coupled diazo-novolac providing 0.05 to 1.0 percent by weight of the resin solids and effective for coloring the composition.

7. A metal article having thereon the insoluble thermoset product of baking the composition of claim 5 at 300 to 400° F. for 8 to 10 minutes.

References Cited by the Examiner

UNITED STATES PATENTS 2,999,832   9/1961   Faerber _____ 260—37

MURRAY TILLMAN, *Primary Examiner.*

MILTON STERMAN, *Examiner.*

T. D. KERWIN, P. LIEBERMAN, *Assistant Examiners.*